UNITED STATES PATENT OFFICE

2,366,317
VULCANIZATION OF RUBBER

Arnold R. Davis, Riverside, Conn., assignor to American Cyanamid Company, New York, N. Y., a corporation of Maine No Drawing. Application August 30, 1941, Serial No. 409,000

19 Claims. (Cl. 260—782)

This invention relates to the vulcanization of rubber and more particularly to the control of the activity of accelerators which possess a tendency to scorch the rubber at processing temperatures, e. g., those occurring in the milling, calendering, extruding, etc. operations or even in storage.

It is known to add acids to rubber for the purpose of preventing or minimizing scorching or premature vulcanization of the rubber due to the activity of vulcanization accelerators at the lower or processing temperatures.

I have discovered a new class of acid retarders for controlling the scorching tendency of accelerators, namely, the monoterpene-maleic anhydride addition products and their volatile and non-volatile portions, all of which are acid anhydrides, and the acids obtainable from these anhydrides by hydrolysis.

The monoterpene-maleic anhydride addition products (adducts) may be produced by heating a monoterpene of the formula $C_{10}H_{16}$ with maleic anhydride or with maleic acid with or without the use of a catalyst. Processes for their preparation and a description of some of the addition products are given for example in U. S. Patents Numbers 1,993,025, 1,993,031, 1,993,034 and 1,993,035.

The monoterpene-maleic anhydride addition products or adducts may be distilled under low pressures to obtain a distillate which has been described as the volatile dibasic acid anhydride of the addition product. For example, at a pressure of 4 mm., the fraction containing the volatile dibasic acid anhydride of the monomeric terpene was distilled over in the temperature range of 160–178° C. The non-volatile residue from the distillation will contain anhydrides of terpene polymers according to the work of E. R. Littman reported in Ind. and Eng. Chem., 28, 1936, pages 1150–51.

In the practice of the invention the acid retarder is incorporated into the unvulcanized rubber, preferably prior to or at about the time of the addition of the accelerator to the rubber. The retarder may be the complete monoterpene-maleic anhydride addition product, the volatile dibasic acid anhydride, the non-volatile residue, or the acids obtainable from these anhydrides by hydrolysis. In its preferred form the invention contemplates the use of the complete monoterpene-maleic anhydride addition product (acid anhydride).

The novel retarders of my invention being resinous and non-crystalline acids will more easily disperse in the rubber than crystalline acid retarders such as benzoic and salicylic acid.

Illustrative of the accelerators with which my acid retarders may be employed for the purpose of preventing or reducing scorching of the rubber are the sulfur-containing accelerators such as mercaptobenzothiazole, benzothiazyl disulfide, the aldehyde-amine accelerators such as butyl and heptyl aldehyde-aniline, and the diaryl guanidine accelerators such as diphenyl and di-o-tolyl guanidine. They may also be used for retarding the activity of accelerator combinations of the character wherein a basic material is used to activate the primary accelerator such as combinations of an acidic type sulphur-containing accelerator and a diaryl guanidine, for example, mercaptobenzothiazole and diphenyl guanidine or di-ortho-tolyl guanidine.

The invention is illustrated by the following specific examples to which however, it is not intended that the invention be limited. The parts are by weight.

Example 1

Benzothiazyl disulfide activated with diphenyl guanidine was employed as the accelerator. Samples were prepared containing a monoterpene-maleic anhydride addition product (adduct) and the volatile dibasic anhydride and the non-volatile residue of an addition product, respectively, and in addition a control containing no acid retarder. The samples were made up in the following proportions:

|  | A | B | C | D |
|---|---|---|---|---|
| Smoked sheets | 100 | 100 | 100 | 100 |
| Zinc oxide | 6 | 6 | 6 | 6 |
| Sulfur | 3 | 3 | 3 | 3 |
| Benzothiazyl disulfide | .75 | .75 | .75 | .75 |
| Diphenyl guanidine | .465 | .465 | .465 | .465 |
| Adduct |  | .23 |  |  |
| Adduct dibasic acid anhydride |  |  | .23 |  |
| Adduct non-volatile residue |  |  |  | .23 |

The samples were then tested in a Williams plastometer using a 3 minute "y" value at 100° C. The results were as follows:

|  | A | B | C | D |
|---|---|---|---|---|
| No heat | .086 | .082 | .078 | .085 |
| After 1.5 hours in water at 85° C | .107 | .084 | .078 | .091 |
| Change percent | +24.4 | +2.44 | 0 | +7.1 |
| After 3 hours in water at 85° C | .176 | .120 | .119 | .157 |
| Change percent | +104.6 | +46.3 | +52.5 | +85 |

The lower percent change in the Williams "y" value after heating indicates the rubber to have scorched less. From the above results it is apparent that the benzothiazyl disulfide-diphenyl guanidine accelerator retarded with the acid materials gives less premature vulcanization than this accelerator combination alone.

The samples were then tested at full cure and showed the following physical properties:

|   | 10 min. at 130° C. | | | 25 min. at 130° C. | | | 40 min. at 130° C. | | |
|---|---|---|---|---|---|---|---|---|---|
|   | Mod.[1] | Ten.[1] | Elong.[2] | Mod.[1] | Ten.[1] | Elong.[2] | Mod.[1] | Ten.[1] | Elong.[2] |
| A | 675 | 3,870 | 760 | 1,305 | 4,090 | 665 | 1,510 | 4,120 | 650 |
| B | 655 | 3,605 | 750 | 1,360 | 4,110 | 660 | 1,560 | 4,310 | 650 |
| C | 625 | 3,660 | 760 | 1,325 | 4,665 | 680 | 1,585 | 4,250 | 645 |
| D | 675 | 4,000 | 775 | 1,345 | 4,275 | 665 | 1,590 | 4,220 | 645 |

[1] Modulus (at 500%) and tensile in lbs./sq. in.
[2] Elongation at break in percent.

The above results show that while the acidic materials retard the action of the accelerator at 85° C. and at processing temperatures, they have little or no effect on the accelerator action at the vulcanization temperature.

In compounding the rubber mixes, the resinous acid retarders may tend to stick to the mill but this may be easily overcome by adding a small amount of stearic acid to the rubber, either as such, or in combination with the acid retarder as a fusion product obtainable by melting together the two materials.

*Example 2*

Mercaptobenzothiazole was employed as the accelerator and as a retarder therefor, there was used respectively, a complete monoterpene maleic anhydride addition product and a complete addition product combined with stearic acid as an anti-tack in the form of a fusion product. The samples were compounded in the following proportions:

|   | Compounds | |
|---|---|---|
|   | E | F |
| Smoked sheets | 400 | 400 |
| Zinc oxide | 24 | 24 |
| Sulfur | 12 | 12 |
| Mercaptobenzothiazole | 4 | 4 |
| Adduct 1 mol } Fused | 2 | |
| Stearic acid .1 mol } Fused | | |
| Adduct | | 2 |

These samples were then given set-up tests in a Williams plastometer employing a 3 minute "y" value at 100° C.

|   | E | F |
|---|---|---|
| No heat | .091 | .090 |
| After 1.5 hours in water at 85° C | .092 | .091 |
| Change percent | +1.1 | +1.1 |
| After 2 hours in water at 85° C | .096 | .097 |
| Change percent | +5.5 | +7.76 |

The tests show that the monoterpene-maleic anhydride addition products have a very decided retarding effect on the activity of mercaptobenzothiazole, both when used alone and in combination with stearic acid.

As will be understood by those skilled in the art, the proportions of the acids incorporated into the vulcanized rubber may be varied with the amount of retarding action desired or with the activity of the accelerator or accelerator combination employed, and, in general, the proportions will be about 0.1% to about 1% on the weight of the rubber.

While the invention has been more particularly described with reference to the use of the acids as accelerator retarders in the vulcanization of natural rubbers, they may be used in like capacity in the vulcanization of synthetic rubbers such as butadiene-acrylonitrile and butadiene-styrene copolymers. Therefore, in the claims, the term rubber is intended to include the synthetic rubbers of the character described, as well as the natural rubbers.

This application is a continuation-in-part of my co-pending application, Serial No. 312,406, filed Jan. 4, 1940.

Since variations and changes may be made in the invention without departing from the spirit or scope thereof, the foregoing description is not intended by way of limitation of the invention except as may be defined in the appended claims.

What I claim is:

1. In the vulcanization of rubber with a vulcanizing agent and an accelerator which is sufficiently active to cause premature vulcanization of the rubber, the improvement which comprises controlling the activity of the accelerator by incorporating in the rubber a small amount of a resinous material selected from the group consisting of monoterpene-maleic anhydride addition product, anhydrides thereof and the acids obtained by hydrolysis of said anhydrides.

2. In the vulcanization of rubber with a vulcanizing agent and an accelerator which is sufficiently active to cause premature vulcanization of the rubber, the improvement which comprises controlling the activity of the accelerator by incorporating in the rubber a small amount of a resinous monoterpene-maleic anhydride addition product.

3. In the vulcanization of rubber with a vulcanizing agent and an organic sulfur-containing accelerator which is sufficiently active to cause premature vulcanization of the rubber, the improvement which comprises controlling the activity of the accelerator by incorporating in the rubber a small amount of a resinous material selected from the group consisting of monoterpene-maleic anhydride addition product, anhydrides thereof and the acids obtained by hydrolysis of said anhydrides.

4. In the vulcanization of rubber with a vulcanizing agent and an organic sulfur-containing accelerator which is sufficiently active to cause premature vulcanization of the rubber, the improvement which comprises controlling the activity of the accelerator by incorporating in the rubber a small amount of a resinous monoterpene-maleic anhydride addition product.

5. In the vulcanization of rubber with a vulcanizing agent, and an accelerator combination of an organic sulfur-containing accelerator and a diaryl guanidine activator therefor, which accelerator combination is sufficiently active to cause premature vulcanization of the rubber, the improvement which comprises controlling the activity of the accelerator combination by incorporating in the rubber a small amount of a resinous material selected from the group consisting of monoterpene-maleic anhydride addition product, anhydrides thereof and the acids obtained by hydrolysis of said anhydrides.

6. In the vulcanization of rubber with a vulcanizing agent and an accelerator combination of an organic sulfur-containing accelerator and a diaryl guanidine activator therefor, which accelerator combination is sufficiently active to cause premature vulcanization of the rubber, the improvement which comprises controlling the activity of the accelerator combination by incorporating in the rubber a small quantity of a resinous monoterpene-maleic anhydride addition product.

7. The process of claim 5, in which the diaryl guanidine activator is diphenyl guanidine.

8. The process of claim 5, in which the diaryl guanidine activator is di-o-tolyl guanidine.

9. In the vulcanization of rubber with a vulcanizing agent and diphenyl guanidine as the accelerator, the improvement which comprises controlling the activity of the diphenyl guanidine by incorporating in the rubber a small quantity of a resinous monoterpene-maleic anhydride addition product.

10. Unvulcanized rubber containing a vulcanizing agent, an accelerator which is sufficiently active to cause premature vulcanization of said rubber, and a small quantity of a resinous material selected from the group consisting of monoterpene-maleic anhydride addition product, anhydrides thereof and the acids obtained by hydrolysis of said anhydrides.

11. Unvulcanized rubber containing a vulcanizing agent, an accelerator which is sufficiently active to cause premature vulcanization of said rubber, and a small quantity of a resinous monoterpene-maleic anhydride addition product.

12. Unvulcanized rubber containing a vulcanizing agent, an organic sulfur-containing accelerator which is sufficiently active to cause premature vulcanization of said rubber, and a small amount of a resinous material selected from the group consisting of monoterpene-maleic anhydride addition product, anhydrides thereof and the acids obtained by hydrolysis of said anhydrides.

13. Unvulcanized rubber containing a vulcanizing agent, an organic sulfur-containing accelerator which is sufficiently active to cause premature vulcanization of said rubber, and a small amount of a resinous monoterpene-maleic anhydride addition product.

14. Unvulcanized rubber as in claim 13, in which the organic sulfur-containing accelerator is mercaptobenzothiazole.

15. Unvulcanized rubber containing a vulcanizing agent, an organic sulfur-containing accelerator, a diaryl guanidine activator therefor, and a small quantity of a resinous material selected from the group consisting of monoterpene-maleic anhydride addition product, anhydrides thereof and the acids obtained by hydrolysis of said anhydrides.

16. Unvulcanized rubber containing a vulcanizing agent, an organic sulfur-containing accelerator, a diaryl guanidine activator therefor, and a small quantity of a resinous monoterpene-maleic anhydride addition product.

17. Unvulcanized rubber containing a vulcanizing agent, benzothiazyl disulfide, a diaryl guanidine activator therefor, and a small amount of a resinous monoterpene-maleic anhydride addition product.

18. Unvulcanized rubber as in claim 17, in which the diaryl guanidine activator is di-orthotolyl guanidine.

19. Unvulcanized rubber containing a vulcanizing agent, diphenyl guanidine as the accelerator, and a small amount of a resinous monoterpene-maleic anhydride addition product.

ARNOLD R. DAVIS.